(12) United States Patent
English et al.

(10) Patent No.: US 7,390,232 B1
(45) Date of Patent: Jun. 24, 2008

(54) EXHAUST SYSTEM FOR A MARINE ENGINE

(75) Inventors: Joshua K. English, Stillwater, OK (US); Derric Drake, Stillwater, OK (US); Duane Harding, Brookfield, OH (US); William C. Martin, Stillwater, OK (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 11/621,192

(22) Filed: Jan. 9, 2007

(51) Int. Cl.
B63B 35/73 (2006.01)
B63H 21/00 (2006.01)
B63H 21/32 (2006.01)

(52) U.S. Cl. .................. 440/89 E; 440/89 R; 440/89 B; 440/89 F; 440/89 C; 440/89 J

(58) Field of Classification Search ................ 440/89 E, 440/89 R, 89 B, 89 F, 89 C, 89 J
See application file for complete search history.

(56) References Cited

U.S. PATENT DOCUMENTS

| 4,220,121 | A |   | 9/1980 | Maggiorana |
| 4,991,546 | A |   | 2/1991 | Yoshimura |
| 5,004,042 | A |   | 4/1991 | McMorries et al. |
| 5,556,311 | A | * | 9/1996 | Fujimoto .................. 440/89 R |
| 5,562,510 | A | * | 10/1996 | Suzuki et al. ............. 440/89 R |
| 5,575,699 | A | * | 11/1996 | Isogawa et al. ........... 440/89 R |
| 5,595,516 | A | * | 1/1997 | Matsumoto et al. ....... 440/89 R |
| 5,746,270 | A |   | 5/1998 | Schroeder et al. |
| 6,368,169 | B1 |   | 4/2002 | Jaeger |
| 6,748,906 | B1 |   | 6/2004 | White et al. |

* cited by examiner

Primary Examiner—Lars A Olson
Assistant Examiner—Daniel V Venne
(74) Attorney, Agent, or Firm—Andrus, Sceales, Starke & Sawall, LLP

(57) ABSTRACT

An exhaust system for a marine propulsion system includes first through fifth exhaust conduit members, including a pair of serially connected marine exhaust elbows laterally spanning the engine.

6 Claims, 6 Drawing Sheets

EXHAUST SYSTEM FOR A MARINE ENGINE

CROSS-REFERENCE TO RELATED APPLICATIONS

Cross reference is made to commonly owned co-pending U.S. patent application Ser. No. 11/651,194, filed Jan. 9, 2007, entitled "CLOSED COOLING SYSTEM FOR A MARINE ENGINE".

BACKGROUND AND SUMMARY

The invention relates to exhaust systems for marine engines.

Marine propulsion systems include an internal combustion engine having a plurality of exhaust ports and mounted in a marine vessel for propelling the vessel. An exhaust system is provided for conducting exhaust gas exteriorly of the vessel. The present invention arose during continuing development efforts directed toward such exhaust systems.

DETAILED DESCRIPTION

Figure 1:
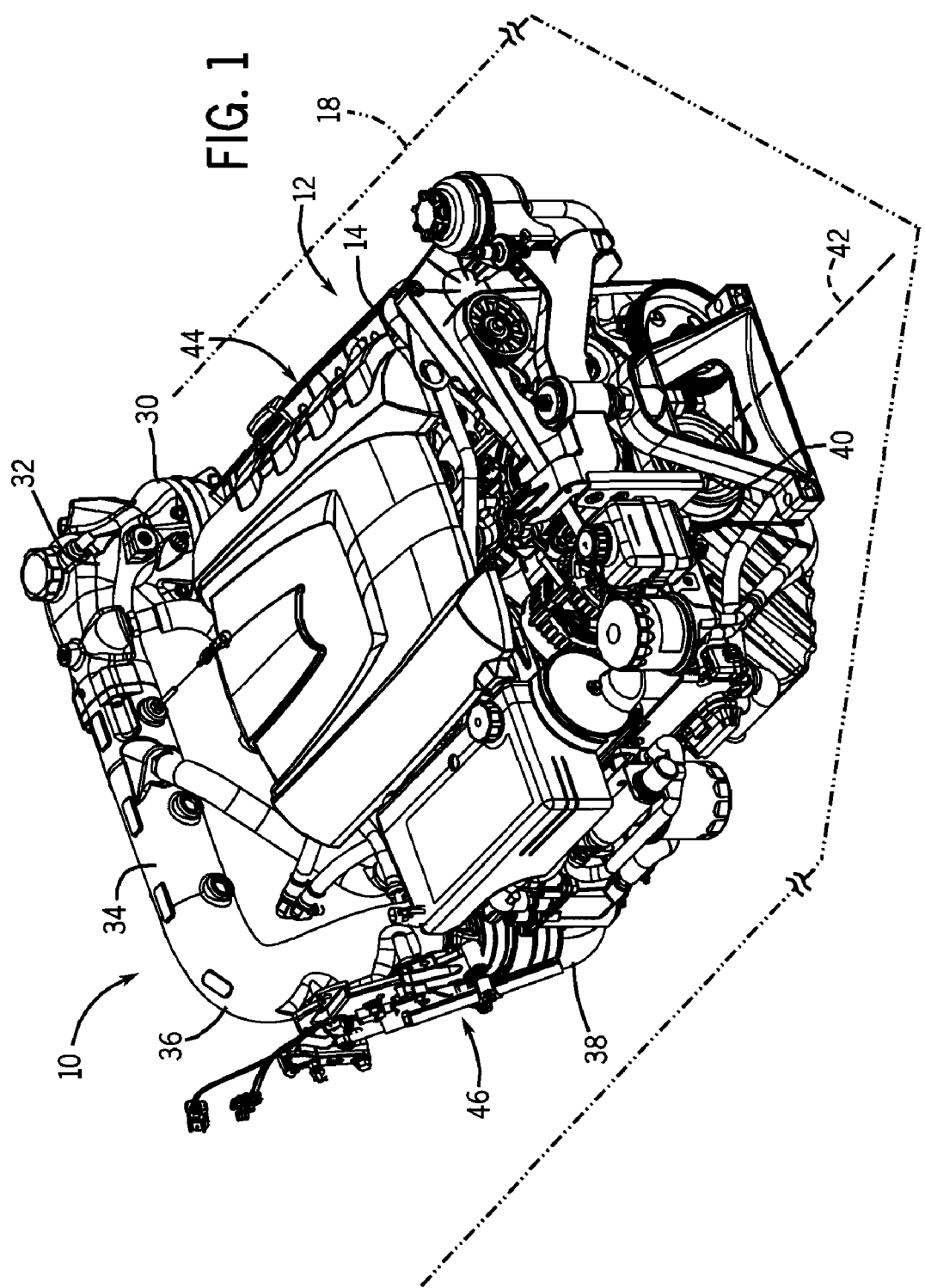
FIG. 1 is an isometric view of an engine comprising the exhaust system of the present invention.
Figure 2:
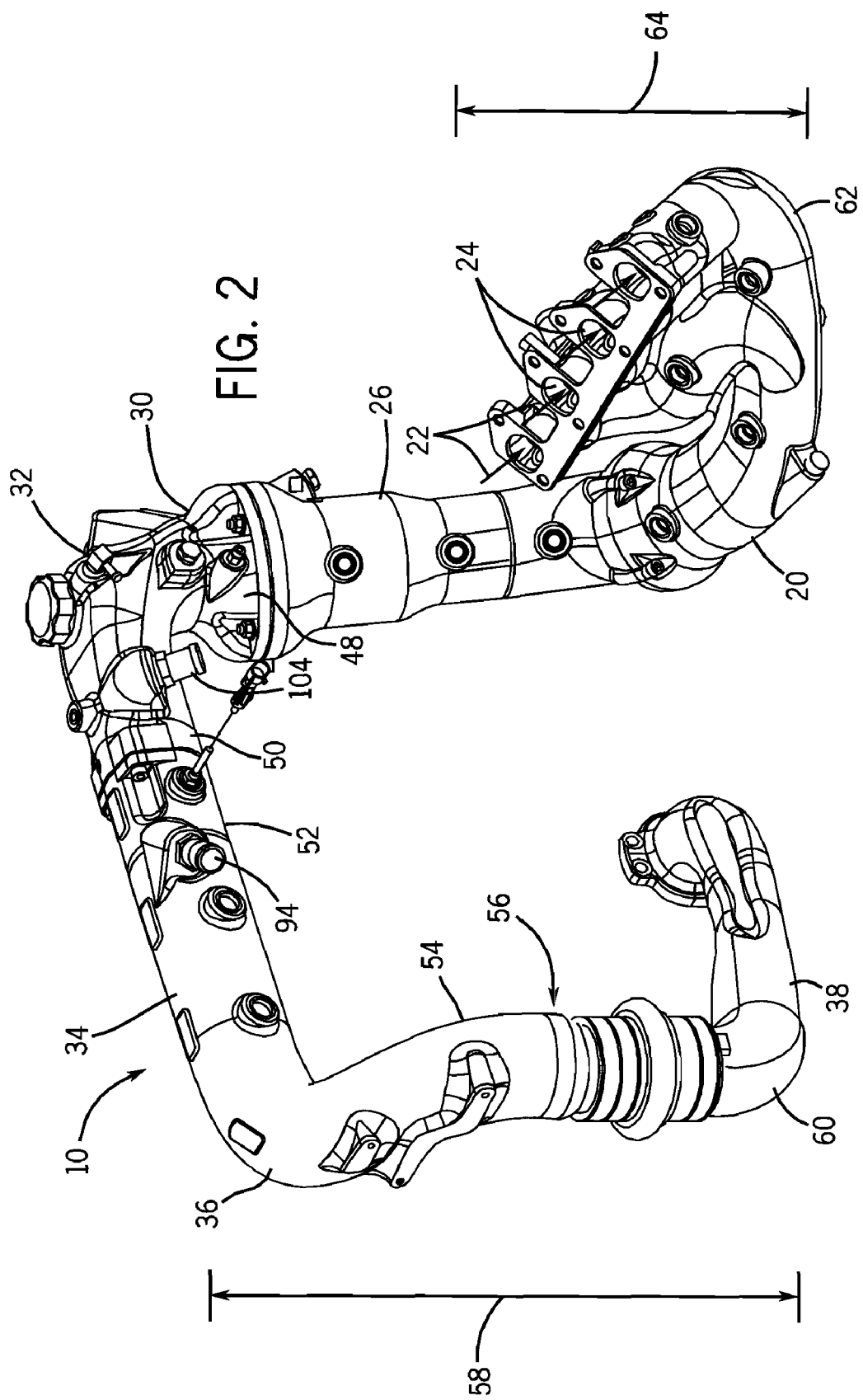
FIG. 2 is an isometric view of the exhaust system of FIG. 1 removed from the engine.
Figure 5:
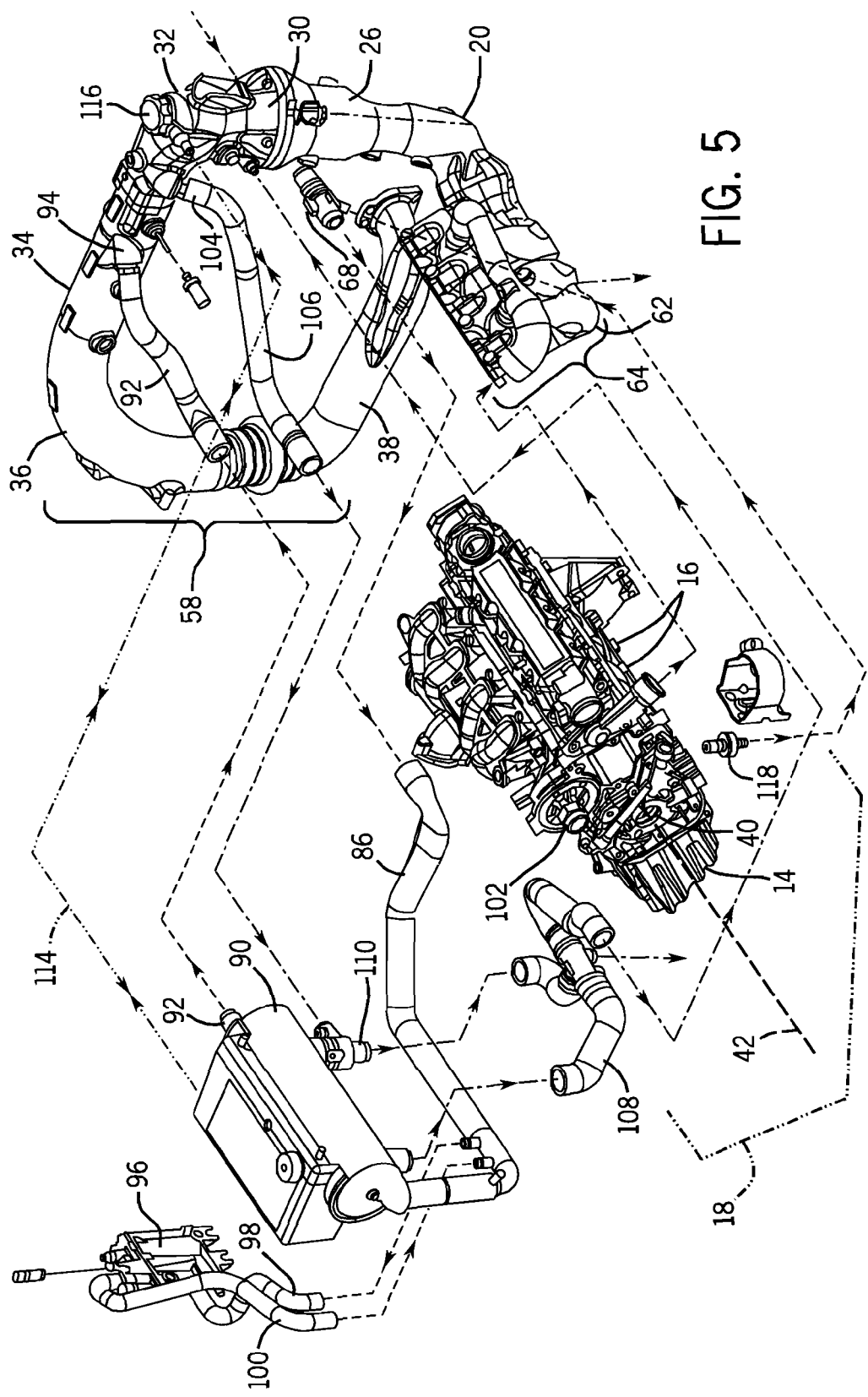
FIG. 5 is an exploded isometric view of selected components of FIG. 1.

FIGS. 1, 2 show an exhaust system 10 for a marine propulsion system 12, for example a stern drive, having an internal combustion engine 14 having a plurality of exhaust ports 16, FIG. 5 and mounted in a marine vessel, schematically shown at 18, for propelling such vessel, as is known. The exhaust system includes a first exhaust conduit member 20, FIG. 2, extending from exhaust ports 16 and conducting exhaust gas therefrom, as shown at arrows 22 extending into exhaust inlet openings 24 of conduit member 20. In the embodiment shown, engine 14 is a four cylinder four stroke engine tilted or slanted relative to vertical, e.g. a 50° angle from vertical. First exhaust conduit member 20 is preferably a tri-Y exhaust manifold, wherein the exhaust port runners from the outer cylinders, namely the first and fourth cylinders, combine and merge at a first Y, and the exhaust port runners from the middle two cylinders, namely the second and third cylinders, combine and merge at a second Y, which first and second Ys combine at a further Y and conduct exhaust downstream therefrom. Tri-Y exhaust manifolds are known in the prior art and beneficially enable exhaust tuning according to the length of the respective exhaust port runner.

Figure 3:
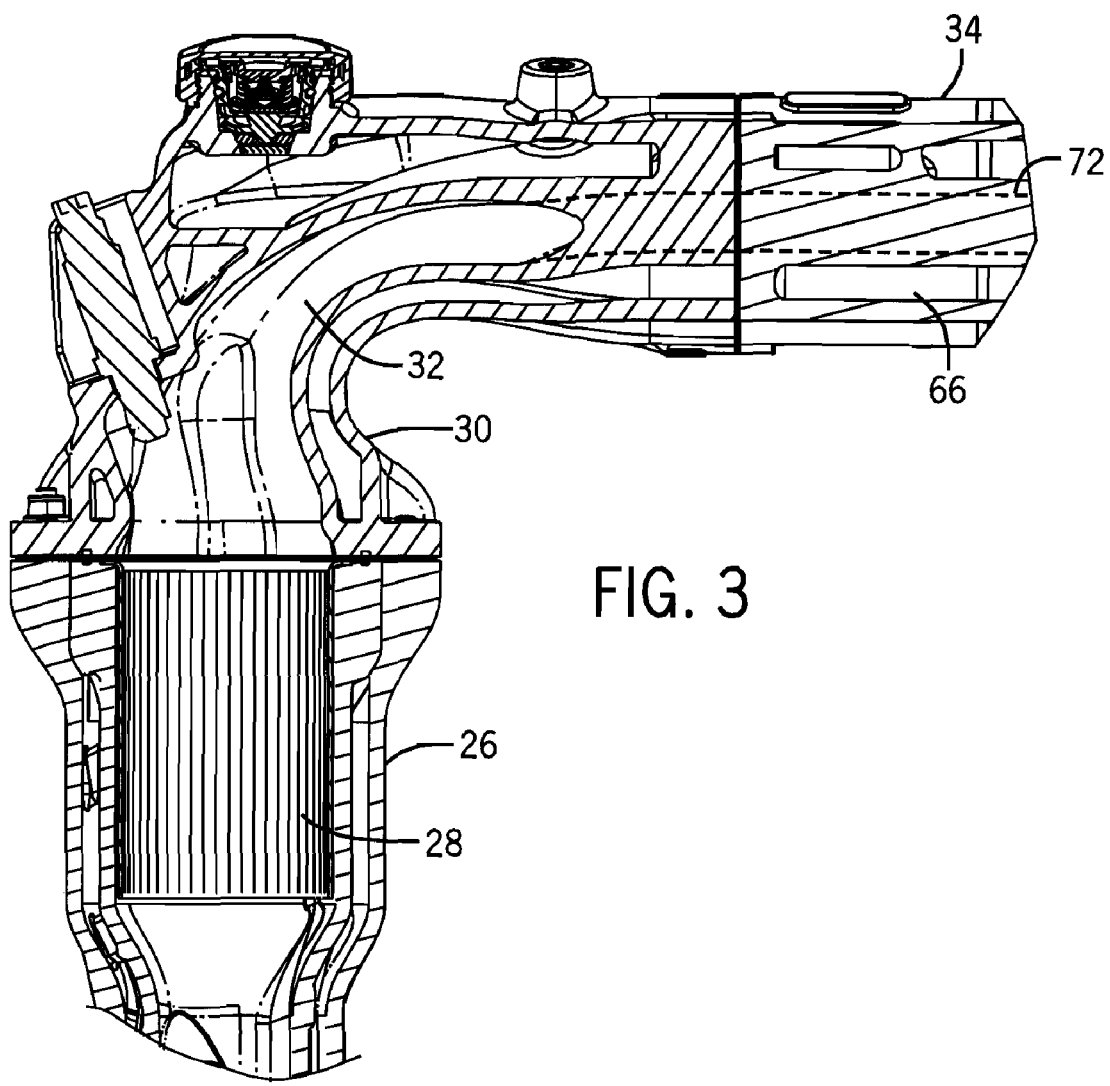
FIG. 3 is a sectional view from the rear of a portion of the exhaust system of FIG. 2.
Figure 4:
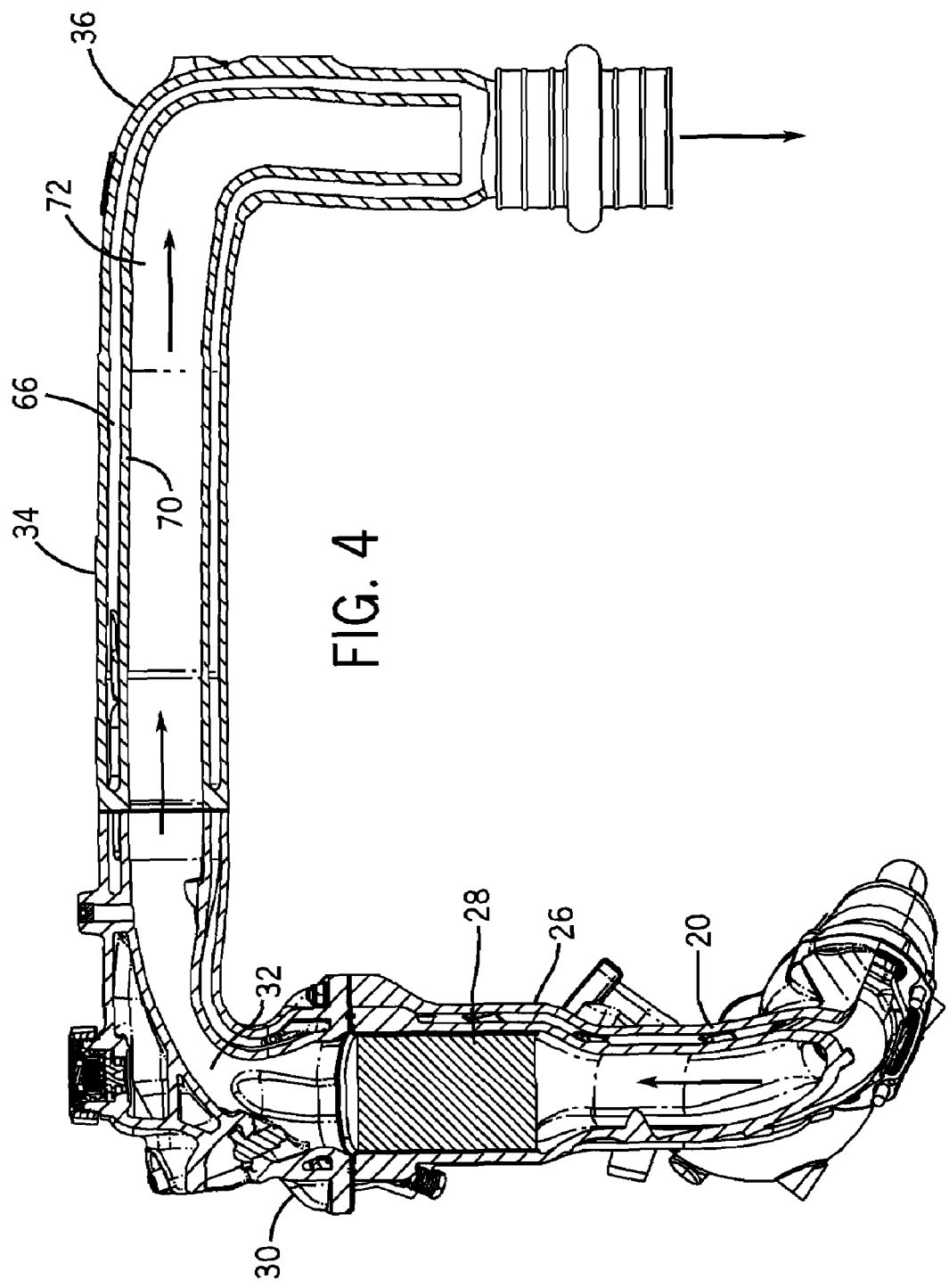
FIG. 4 is an elevation view from the rear of the exhaust system of FIG. 2, partially cut away.

A second exhaust conduit member 26 extends upwardly from first exhaust conduit member 20 and houses a catalyst 28, FIGS. 3, 4, through which exhaust gas flows for catalytic reaction therewith. A third exhaust conduit member 30 extends upwardly from second exhaust conduit member 26 and conducts exhaust gas upwardly and then laterally at a first bend 32. Third exhaust conduit member 32 is preferably a marine exhaust elbow, to be described. A fourth exhaust conduit member 34 extends laterally from third exhaust conduit member 30 and conducts exhaust gas laterally and then downwardly at a second bend 36. Fourth exhaust conduit member 34 is preferably a marine exhaust elbow, to be described. A fifth exhaust conduit member 38 extends from fourth exhaust conduit member 34 and conducts exhaust gas exteriorly of vessel 18, for example preferably through the vessel transom and then through an external gearcase of a marine stern drive for discharge through the propeller hub, as is known.

Engine 14 has a crankshaft 40, FIGS. 1, 5, extending along an axis 42. First and second bends 32 and 36 of the third and fourth exhaust conduit members 30 and 34, respectively, are on laterally distally opposite sides of axis 42, FIG. 1. Engine 14 has first and second lateral sides 44 and 46, e.g. port and starboard sides, respectively, spaced on laterally distally opposite sides of axis 42. Exhaust ports 16 and first and second exhaust conduit members 20 and 26 are on the noted first lateral side 44 of the engine. Third exhaust conduit member 30 has a lower arm 48 extending upwardly from second exhaust conduit member 26 to first bend 32, and has a lateral arm 50 extending laterally from first bend 32. Fourth exhaust conduit member 34 has a lateral arm 52 extending laterally from lateral arm 50 to second bend 36, and has a lower arm 54 extending downwardly from second bend 36 to fifth exhaust conduit member 38. Lateral arms 50 and 52 laterally span axis 42 between the noted first and second lateral sides 44 and 46 of the engine.

A sea water trap 56, FIG. 2, is provided against sea water ingress reversion back into the engine. Second bend 36 has a given vertical elevation 58 along lower arm 54 and a portion of fifth exhaust conduit member 38 above a bend 60 in fifth exhaust conduit member 38, providing the sea water trap. Further in the preferred embodiment, a double sea water trap is provided against sea water ingress reversion back into the engine. First exhaust conduit member 20 extends laterally and downwardly from exhaust ports 16 to a lower reach 62. Exhaust ports 16 at inlet openings 24 of exhaust conduit member 20 have a given vertical elevation 64 above lower reach 62 of first exhaust conduit member 20, which vertical elevation 64 provides a second sea water trap. A double sea water trap is thus provided by two elevations 58 and 64 through which sea water must climb to ingress engine 14 through exhaust ports 16. The double sea water trap is considered highly desirable in a marine exhaust system, to protect the engine against damage from sea water reversion back through the exhaust system.

At least one, and further preferably at least two, and further preferably at least three of the noted first through fifth exhaust conduit members is coolant-jacketed. In the disclosed embodiment, each of the second, third, and fourth exhaust conduit members is coolant-jacketed. In the preferred embodiment, third exhaust conduit member 30 is coolant-jacketed in a closed-loop cooling system, and fourth exhaust conduit member 34 is coolant-jacketed in an open cooling system different than the noted closed-loop cooling system. Coolant in the open cooling system is sea water, and fourth exhaust conduit member 34 has a water jacket 66, FIGS. 3, 4. The open cooling system passes sea water through water jacket 66 and merges the sea water with exhaust gas in fifth exhaust conduit member 38, as is known for a marine exhaust elbow. The sea water inlet is preferably in the gearcase outdrive of a stern drive, as is known, and pumped by a water pump 68, FIGS. 5, 6, as is known. The merged exhaust gas and cooling sea water in fifth exhaust conduit member 38 is discharged through the stern drive outer gearcase and then through the propeller hub, as is known. Third exhaust conduit member 30 is coolant-jacketed in a closed-loop cooling system, and preferably second exhaust conduit member 26 is coolant-jacketed, including at catalyst 28, in the same said closed-loop cooling system. The closed-loop cooling system is preferably that of the engine, and the coolant is preferably ethylene glycol. Closed-loop cooling is desirable because it maintains a desired uniform temperature of the catalyst, and also because it enables the respective exhaust system components to be lost foam cast aluminum, rather than cast iron or the like otherwise necessary to withstand the corrosive effects of sea water. Lost foam cast aluminum is desirable for weight reduction. Third and fourth exhaust conduit members 30 and 34 comprise first and second marine exhaust elbows, respectively, connected in series and serially conducting exhaust gas therethrough, namely upwardly then laterally then downwardly. The second elbow 34 is water-jacketed and includes an internal sidewall 70, FIG. 4, having an exhaust passage 72 on one side and a water jacket passage at 66 on the other side. Sea water flows through water jacket passage 66 and joins the exhaust gas in fifth exhaust conduit member 38. First elbow 30 is coolant-jacketed and circulates coolant therethrough in a closed-loop cooling system. As noted, second exhaust conduit member 26 is coolant-jacketed, including at catalyst 28, and circulates coolant therethrough preferably in the same said closed-loop cooling system as the first elbow 30.

Figure 6:
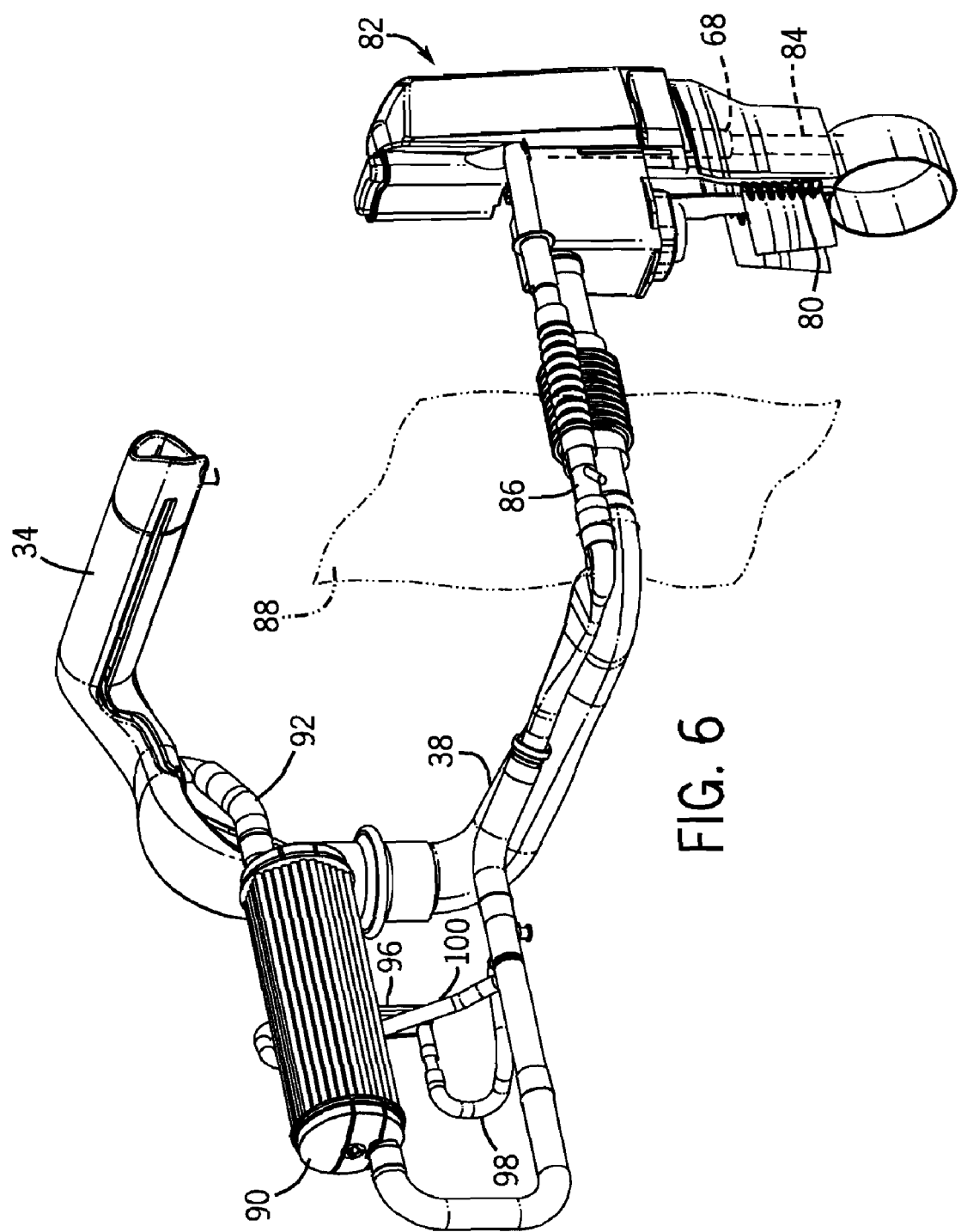
FIG. 6 is an isometric view of a portion of the system of FIG. 5 and including a portion of a stern drive.

Referring to FIGS. 5 and 6, cooling sea water is drawn into inlets 80 on the sides of a gearcase 82 of a stem drive and is pumped upwardly therefrom by pump 68 driven by a driveshaft 84 in the gearcase, as is known. The sea water is pumped by pump 68 through conduit 86 which extends through the transom 88 of vessel 18. The pumped sea water flows through a heat exchanger 90 then through conduit 92 to inlet fitting 94, FIG. 2, of elbow 34, and then flows through water jacket passage 66 to merge with exhaust gas in fifth exhaust conduit member or lower exhaust pipe 38. A water cooled fuel supply module 96 can also be connected to conduit 86 at supply and return lines 98 and 100, respectively. A power steering cooler may also be connected to conduit 86 to receive cooling sea water. The closed-loop cooling system includes a circulation pump 102 pumping coolant through the coolant jackets of the engine then through the coolant jackets of first through third exhaust conduit members 20, 26, 30 then through outlet fitting 104 of the latter then through conduit 106 to heat exchanger 90, for cooling by the noted cooling sea water flowing through the heat exchanger, and then the coolant is returned at conduit 108 to circulating pump 102. A thermostat 110 is provided in the closed-loop cooling system to bypass heat exchanger 90 during warm-up and to control the temperature of coolant flowing through the closed-loop cooling system. A coolant reservoir 112 is connected through a conduit shown in dashed line at 114 to pressure cap 116 at elbow 30 and allows bidirectional flow therebetween for venting of excess pressure through pressure relief cap 116. A flush connection 118 is provided to enable the operator to flush the cooling system.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An exhaust system for a marine propulsion system having an internal combustion engine having a plurality of exhaust ports and mounted in a marine vessel for propelling the vessel, comprising:
   a first exhaust conduit member extending from said exhaust ports and conducting exhaust gas therefrom;
   a second exhaust conduit member extending upwardly from said first exhaust conduit member, said second exhaust conduit member housing a catalyst through which exhaust gas flows;
   a third exhaust conduit member extending upwardly from said second exhaust conduit member and conducting exhaust gas upwardly and then laterally at a first bend;
   a fourth exhaust conduit member extending laterally from said third exhaust conduit member and conducting exhaust gas laterally and then downwardly at a second bend;
   a fifth exhaust conduit member extending from said fourth exhaust conduit member and conducting exhaust gas exteriorly of said vessel,
   wherein said third and fourth exhaust conduit members are coolant-jacketed, said third exhaust conduit member is coolant-jacketed in a closed-loop cooling system, and said fourth exhaust conduit member is coolant-jacketed in an open cooling system.

2. The exhaust system according to claim 1 wherein the coolant in said open cooling system is sea water, and said fourth exhaust conduit member has a water jacket, and said open cooling system passes sea water through said water jacket and merges said sea water with exhaust gas in said fifth exhaust conduit member.

3. An exhaust system for a marine propulsion system having an internal combustion engine having a plurality of exhaust ports and mounted in a marine vessel for propelling the vessel, comprising:
   a first exhaust conduit member extending from said exhaust ports and conducting exhaust gas therefrom;
   a second exhaust conduit member extending upwardly from said first exhaust conduit member, said second exhaust conduit member housing a catalyst through which exhaust gas flows;
   a third exhaust conduit member extending upwardly from said second exhaust conduit member and conducting exhaust gas upwardly and then laterally at a first bend;
   a fourth exhaust conduit member extending laterally from said third exhaust conduit member and conducting exhaust gas laterally and then downwardly at a second bend;
   a fifth exhaust conduit member extending from said fourth exhaust conduit member and conducting exhaust gas exteriorly of said vessel,
   wherein said third exhaust conduit member is coolant-jacketed in a closed-loop cooling system, and said second exhaust conduit member is coolant-jacketed, including at said catalyst, in the same said closed-loop cooling system.

4. An exhaust system for a marine propulsion system having an internal combustion engine having a plurality of exhaust ports and mounted in a marine vessel for propelling the vessel, comprising:
   a first exhaust conduit member extending from said exhaust ports and conducting exhaust gas therefrom;
   a second exhaust conduit member extending upwardly from said first exhaust conduit member, said second exhaust conduit member housing a catalyst through which exhaust gas flows;

a third exhaust conduit member extending upwardly from said second exhaust conduit member and conducting exhaust gas upwardly and then laterally at a first bend;

a fourth exhaust conduit member extending laterally from said third exhaust conduit member and conducting exhaust gas laterally and then downwardly at a second bend;

a fifth exhaust conduit member extending from said fourth exhaust conduit member and conducting exhaust gas exteriorly of said vessel, wherein said third and fourth exhaust conduit members comprise first and second marine exhaust elbows, respectively, connected in series and serially conducting exhaust gas therethrough, namely upwardly then laterally then downwardly, said second elbow is water-jacketed and includes an internal sidewall having an exhaust gas passage on one side and a water jacket passage on the other side, and wherein sea water flows through said water jacket passage and joins said exhaust gas in said fifth exhaust conduit member.

5. The exhaust system according to claim 4 wherein said first elbow is coolant-jacketed and circulates coolant therethrough in a closed-loop cooling system.

6. The exhaust system according to claim 5 wherein said second exhaust conduit member is coolant-jacketed, including at said catalyst, and circulates coolant therethrough in the same said closed-loop cooling system as said first elbow.

* * * * *